(12) United States Patent
Kreisel et al.

(10) Patent No.: US 11,677,107 B2
(45) Date of Patent: Jun. 13, 2023

(54) TEMPERATURE-CONTROL DEVICE FOR INDIVIDUAL BATTERY CELLS ASSEMBLED TO FORM A MODULE

(71) Applicant: Raiffeisenlandesbank Oberösterreich AG, Linz (AT)

(72) Inventors: Philipp Kreisel, Freistadt (AT); Johann Kreisel, Freistadt (AT); Markus Kreisel, Freistadt (AT)

(73) Assignee: John Deere Electric Powertrain LLC, Moline, IL (US)

( * ) Notice: Subject to any disclaimer, the term of this patent is extended or adjusted under 35 U.S.C. 154(b) by 388 days.

(21) Appl. No.: 17/054,767

(22) PCT Filed: May 9, 2019

(86) PCT No.: PCT/AT2019/050018
§ 371 (c)(1),
(2) Date: Nov. 11, 2020

(87) PCT Pub. No.: WO2019/232557
PCT Pub. Date: Dec. 12, 2019

(65) Prior Publication Data
US 2021/0249706 A1    Aug. 12, 2021

(30) Foreign Application Priority Data
Jun. 8, 2018  (AT) .............................. A 50457/2018

(51) Int. Cl.
*H01M 10/617*   (2014.01)
*H01M 10/643*   (2014.01)
(Continued)

(52) U.S. Cl.
CPC ....... *H01M 10/617* (2015.04); *H01M 10/643* (2015.04); *H01M 10/6568* (2015.04);
(Continued)

(58) Field of Classification Search
CPC ............. H01M 10/617; H01M 10/643; H01M 10/6567; H01M 10/6568; H01M 50/213; Y02E 60/10
See application file for complete search history.

(56) References Cited

U.S. PATENT DOCUMENTS 6,379,837 B1 *  4/2002  Takahashi ........... H01M 50/296
                                                        429/151
10,483,606 B2   11/2019 Kreisel et al.
(Continued)

FOREIGN PATENT DOCUMENTS

| DE | 202016107089 U1 | 2/2017 |
| KR | 20130022107 A | 3/2013 |
| WO | 2017/067923 A1 | 4/2017 |

OTHER PUBLICATIONS

English language Abstract for KR20130022107 A, Mar. 6, 2013.

*Primary Examiner* — Lingwen R Zeng
(74) *Attorney, Agent, or Firm* — Tiajoloff & Kelly LLP

(57) ABSTRACT

A temperature control device for individual battery cells (2) assembled to form a module (1), having a base body (3) which, for the purpose of circumferentially enclosing the battery cells (2), comprises two opposing sealing elements (4, 5) having passage openings (6) located opposite one another in pairs with respect to a respective joining axis, and which base body (3) forms a flow channel extending transversely to the joining axes for a temperature control fluid is described. In order to design a temperature control device of the type described above in such a way that, with less manufacturing effort, an increased tightness of the device is achieved at the same time, even at higher flow rates of the temperature control fluid, it is proposed that the sealing elements (4, 5) are two moulded parts which are identical to one another and which are aligned point-symmetrically with respect to one another and connected to one another and
(Continued)

Figure 1:
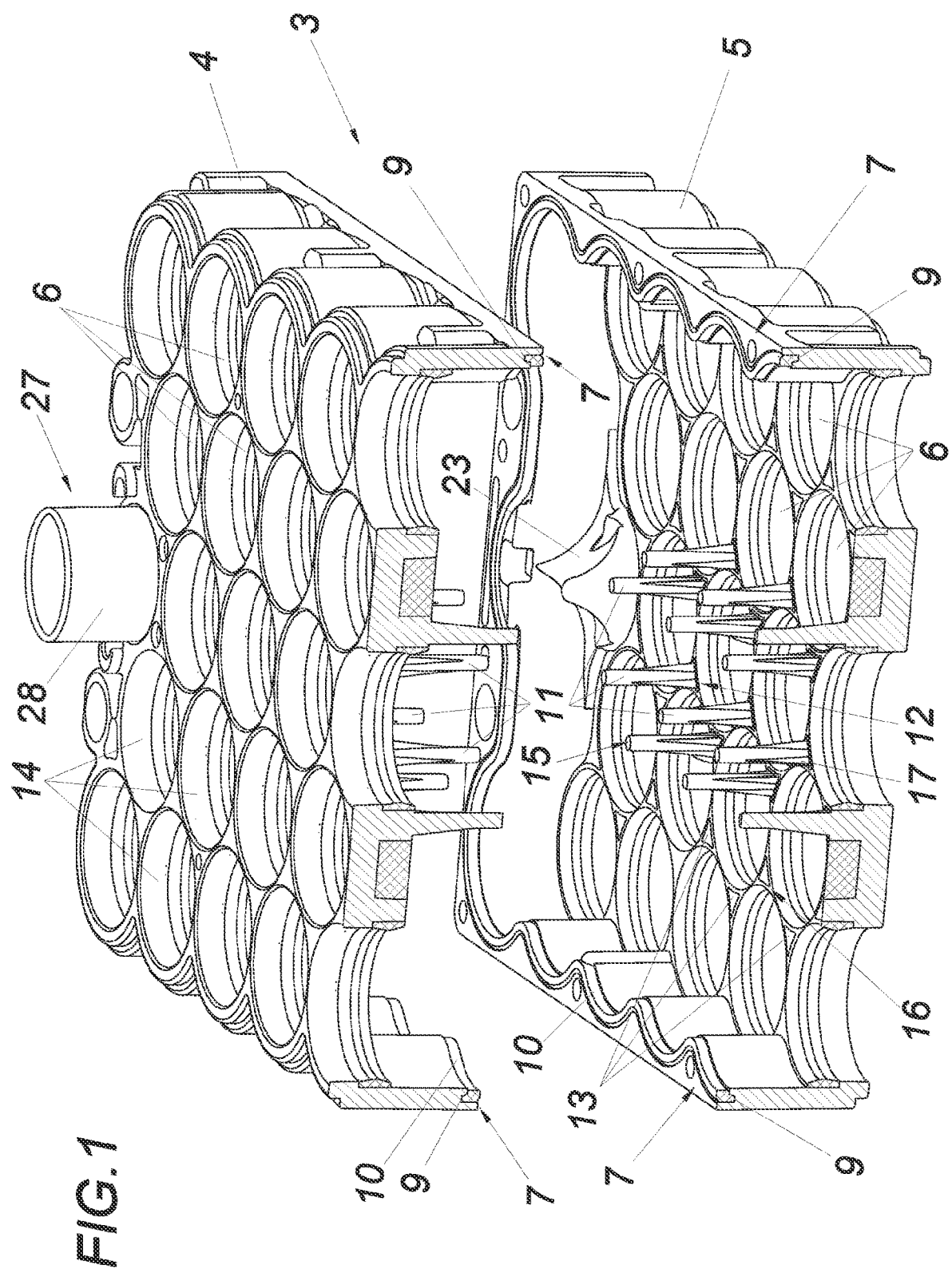

which sealing elements (4, 5) form via a respective bearing surface (7) the base body (3), wherein a receiving groove (9) having a seal compensation region (8) adjoins the bearing surface (7) on the inside of the base body (3).

16 Claims, 4 Drawing Sheets

(51) Int. Cl.
| | | |
|---|---|---|
| *H01M 10/6568* | (2014.01) | |
| *H01M 50/213* | (2021.01) | |
| *H01M 10/6567* | (2014.01) | |

(52) U.S. Cl.
CPC ...... *H01M 50/213* (2021.01); *H01M 10/6567* (2015.04); *Y02E 60/10* (2013.01)

(56) References Cited

U.S. PATENT DOCUMENTS

| | | | |
|---|---|---|---|
| 2009/0325052 A1 | 12/2009 | Koetting et al. | |
| 2017/0279172 A1* | 9/2017 | Tucker | H01M 50/249 |
| 2018/0316074 A1 | 11/2018 | Kreisel et al. | |
| 2019/0020001 A1* | 1/2019 | Nakano | H01M 50/383 |

* cited by examiner

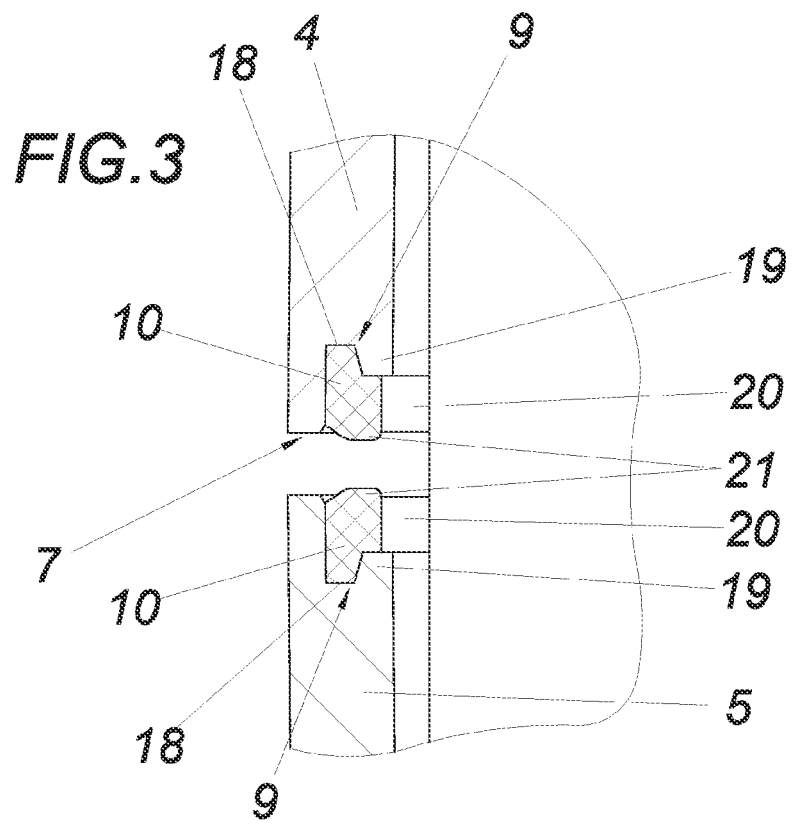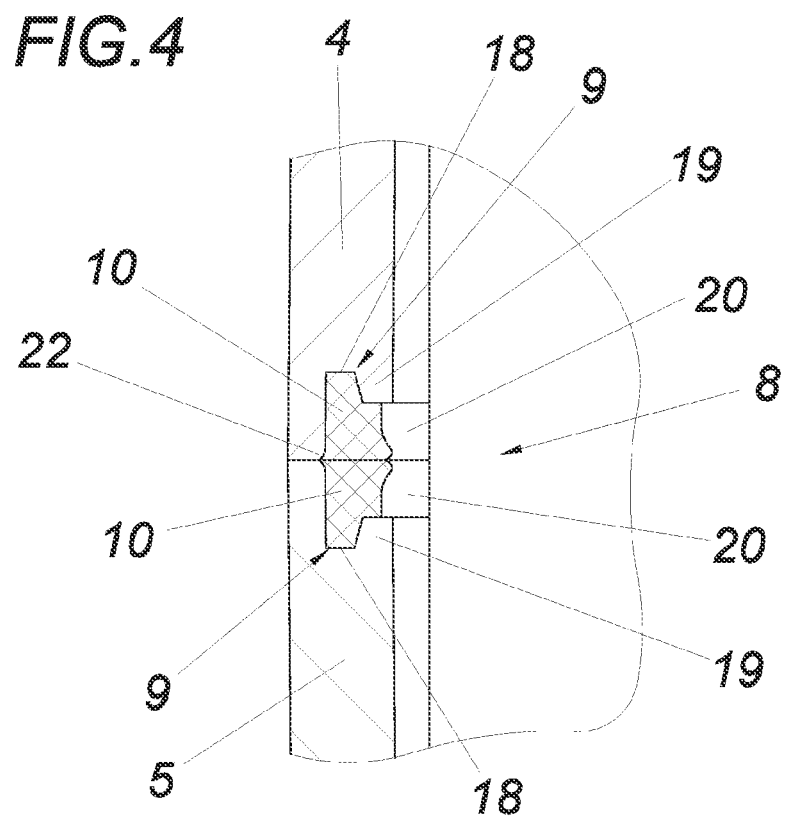

TEMPERATURE-CONTROL DEVICE FOR INDIVIDUAL BATTERY CELLS ASSEMBLED TO FORM A MODULE

TECHNICAL AREA

The invention relates to a temperature control device for individual battery cells assembled to form a module, with a base body which comprises two opposing sealing elements with passage openings in pairs opposite one another with respect to each joining axis for surrounding the periphery of the battery cells and forms a flow channel for a temperature control fluid running transversely to the joining axes.

Battery cells, especially those based on lithium-ion technology, have a service life that is strongly dependent on the operating temperature, whereby even temperature differences of 1 to 3 degrees Celsius can lead to significant aging. Particularly in the case of shock loads of such battery cells, it is therefore essential to quickly dissipate the thermal energy generated by the chemical processes in order to ensure a long service life. The use of fluid temperature control devices has proven to be very advantageous, not least to prevent a possible fire hazard. However, such devices can usually only achieve a sluggish control behavior because flow turbulence and the resulting dynamic pressures prevent faster flow speeds and the associated volume throughput. This is further complicated by the use of highly volatile tempering fluids, for which a reliable seal is required.

STATE OF THE ART

State of the art temperature control devices are known for individual battery cells in a battery system, which are assembled to form a module, with a base body comprising two opposing sealing elements and forming a liquid chamber for the temperature control fluid supplied to the device. (WO 2017/067923 A1). The sealing elements have passage openings in pairs opposite each other to enclose the periphery of the battery cells with respect to one joining axis each, so that the tempering fluid partially flows around the individual battery cells, while the anode and the cathode for electrical contact are located outside the base body. A disadvantage of the temperature control devices known from WO 2017/067923 A1 is therefore that extremely small manufacturing tolerances of the sealing elements as well as of the seals must be maintained in order to achieve a sufficient seal of the base body after assembly compared to an increased system pressure due to the higher flow velocity of the temperature control fluid and thus to prevent the temperature control fluid from escaping from the base body, which, however, involves an enormous manufacturing effort.

DESCRIPTION OF THE INVENTION

The invention is thus based on the task of designing a temperature control device of the type described above in such a way that, with less manufacturing effort, an increased tightness of the device is achieved at the same time, even at higher flow rates of the temperature control fluid.

The invention solves the task set by the fact that the sealing elements are two moulded parts which are identical to each other, which are aligned point-symmetrically to each other and connected to each other via a respective bearing surface each to form the base body, whereby a receiving groove with a seal compensation area adjoins the bearing surface on the inside of the base body.

Since the two sealing elements are designed as identical parts, for example, produced in the injection molding process with the same mold cavity, they have essentially identical component tolerances, which means that there is no need for separate matching of two different sealing elements. Normally, a common, circumferential edge seal would be used to seal two such sealing elements, but this would involve a high manufacturing effort when joining the two sealing elements, because both sealing elements have receiving grooves for the common edge seal, and the surface pressure between the edge seal and the respective receiving groove walls required for sealing could only be ensured by precisely aligning the common edge seal to the respective receiving grooves. According to the invention, it is therefore intended that both sealing elements each have a separate, circumferential edge seal that is inserted into the respective receiving groove. Since this causes the two edge seals to be pressed together when the sealing elements are joined, which an expert would regularly avoid in order to prevent leakage due to undesired deformation of the edge seals, a seal compensation area is provided in the receiving groove on the inside of the base body adjacent to the bearing surface, which remains free in the non-assembled state and enables a predefined deformation of the edge seals. Only when the two sealing elements are joined together and a sufficient surface pressure is reached, the seal compensation region is at least partially filled by the respective edge seal. If the seal compensation region is provided on the side of the receiving groove facing away from the bearing surface, it is also possible to prevent the side walls of the sealing elements forming the bearing surfaces from being deformed towards the outside of the base body and no longer being in alignment with each other, which would make it impossible to achieve a predefined surface pressure of the edge seals.

In order to ensure a reliable seal even with a larger seal compensation region in relation to the edge seal, it is suggested that the receiving groove has a positioning step for an edge seal that protrudes from the groove base and that the groove region remaining free above the positioning step forms the seal compensation region. This prevents undesired displacement of the seal within the receiving groove, because the edge seal is fixed in the area of the groove base between a groove wall and the positioning step transversely to its longitudinal direction, while elastic deformation of the edge seal body in the seal compensation region formed above the positioning step remains possible. In addition, the elastic deformation also causes the edge seal to be pressed against the positioning step, thus improving the sealing between the edge seal and the receiving groove itself.

A particularly advantageous sealing effect with simultaneous reduction of residual stresses is achieved if the edge seal has a sealing bead which slopes down towards the bearing surface and underneath it. As a result of these features, a second seal compensation region is also formed on the outside of the base body adjacent to the receiving groove, which enables an aligned transition of the side walls of the two sealing elements forming the bearing surfaces, even if an edge sealing bead that protrudes more strongly than the bearing surfaces is intended to achieve a higher surface pressure.

In order to avoid damage to the passage seals running in the circumferential direction of the passage openings, especially when joining the battery cells, the sealing elements can each have support pins projecting on the inside of the base body between three adjacent passage openings and extending in the direction of the joining axes, which supporting pins form a support body in the transition area to the passage openings for the passage seals extending in the circumferential direction of the passage openings. On the one hand, the support pins, which rest on one another in the assembled state, prevent the sealing elements from deforming in the direction of the joining axes and the associated twisting of the passage seals in the event of a force load occurring due to the insertion of a battery cell. On the other hand, the supporting bodies form a defined bearing surface for the passage seals so that they have a defined position before assembly, do not influence each other during assembly and after insertion of the battery cells and thus achieve a predetermined surface pressure compared to the inserted battery cells. The combination of both features prevents damage to the passage seals during assembly, because the passage seals do not protrude unevenly into the receiving areas for the battery cells to be inserted and can therefore be sheared off or even torn off during assembly. In order not to unnecessarily deteriorate the flow characteristics of the temperature control fluid through the support pins, these can only be arranged in the area of the passage openings which are first fitted with battery cells according to the specified joining scheme. However, support bodies can of course also be arranged where no support pins are provided in this case.

Particularly advantageous production conditions are obtained when the edge seal is bonded to the receiving groove in the multi-component injection molding process. For example, the soft component of the edge seal can be a thermoplastic elastomer, while the receiving groove can be designed as polyoxymethylene in the sense of a hard component. This results in a seal between the receiving groove and the edge seal injected into it, regardless of the surface pressure.

For even better manufacturing conditions and improved sealing of the battery cells, the passage seals can also be connected to the supporting bodies by means of a multi-component injection molding process. These measures result in a seal between the passage openings and the passage seals, regardless of the surface pressure. Likewise, the passage seals are prevented from protruding into the area where the battery cells are mounted, thus preventing them from shearing off or tearing off during the battery cell joining process. Particularly favorable manufacturing conditions and a high sealing effect are achieved if both the edge seal and the passage seals are designed as thermoplastic elastomers in the sense of a soft component and the receiving groove or support body as polyoxymethylene in the sense of a hard component. It may also be provided that the hard and soft components are joined together by an additionally injected, adhesion-promoting intermediate component.

In order to improve sealing, it is suggested that the sealing elements each have a temperature control fluid connection and a flow divider opposite the temperature control fluid connection of the respective other sealing element, which has a point-symmetric alignment. Temperature control fluid connections running in the direction of the joining axes have the advantage of a particularly compact design of modules made up of individual battery cells and thus a high power density, because there is no need to provide temperature control fluid connections that extend beyond the cross-section of the modules in the direction of the joining axes and the connecting lines between the modules can be kept particularly short. According to the invention, particularly advantageous design conditions arise in this context if the tempering fluid connections form female connectors, so that, due to the equal sealing elements, two successive base bodies can be flow-connected to each other via a male connector inserted into the two connectors. At higher flow speeds, however, turbulence and back pressure occur in the flow channel and at the temperature control fluid connections. In addition, a uniform flow to all battery cells in the flow channel is not guaranteed. By providing a flow divider opposite the respective temperature control fluid connection, not only can the temperature control fluid flow be diverted from the direction of the joining axes into the longitudinal direction of the flow channel with as little turbulence as possible, but the fluid flow can also be divided into several partial flows, which avoids pressure peaks in the area of the seals.

In this context, particularly advantageous flow conditions can be created if the flow divider has a main guide ridge extending substantially radially to a first passage opening adjacent to the flow divider. This divides the tempering fluid flow along the two sides of the ridge and the tempering fluid flow already flows around the first battery cell in two partial flows tangential to the battery cell. As a result, the first and subsequent cells can be better surrounded by the temperature control fluid. This also results in better sealing of the module, as it ensures that the seals are not exposed to unnecessarily high flow pressures.

In order to further reduce pressure peaks and, in particular, to enable a uniform flow also to the battery cells located at the edge of the flow channel, it is proposed that the flow divider comprises two secondary guide ridges that are extending symmetrically to the main guide ridge and each substantially radially to a passage opening adjoining the first passage opening. As a result of this measure, a total of four partial flows are formed, of which the battery cells lying at the edge of the flow channel lie against the inner wall of the base body and flow tangentially around the battery cells lying in the edge area of the flow channel at their outer surfaces facing the inner wall of the base body. To further reduce back pressures, the crest of the main guide ridge and/or the secondary guide ridges can widen from the temperature control fluid connection area to the adjacent passage openings, because the fluid flow only needs to be split up when the fluid flow hits directly in the area of the temperature control fluid connection, while subsequently the individual partial flows should be separated from each other to such an extent that they essentially flow tangentially around the battery cells. It goes without saying that the geometries of both main and secondary ridges can be designed differently or additional secondary ridges can be provided in the course of flow optimization.

BRIEF DESCRIPTION OF THE INVENTION

In the drawing, for example, the object of the invention is shown. Show it

Figure 2:
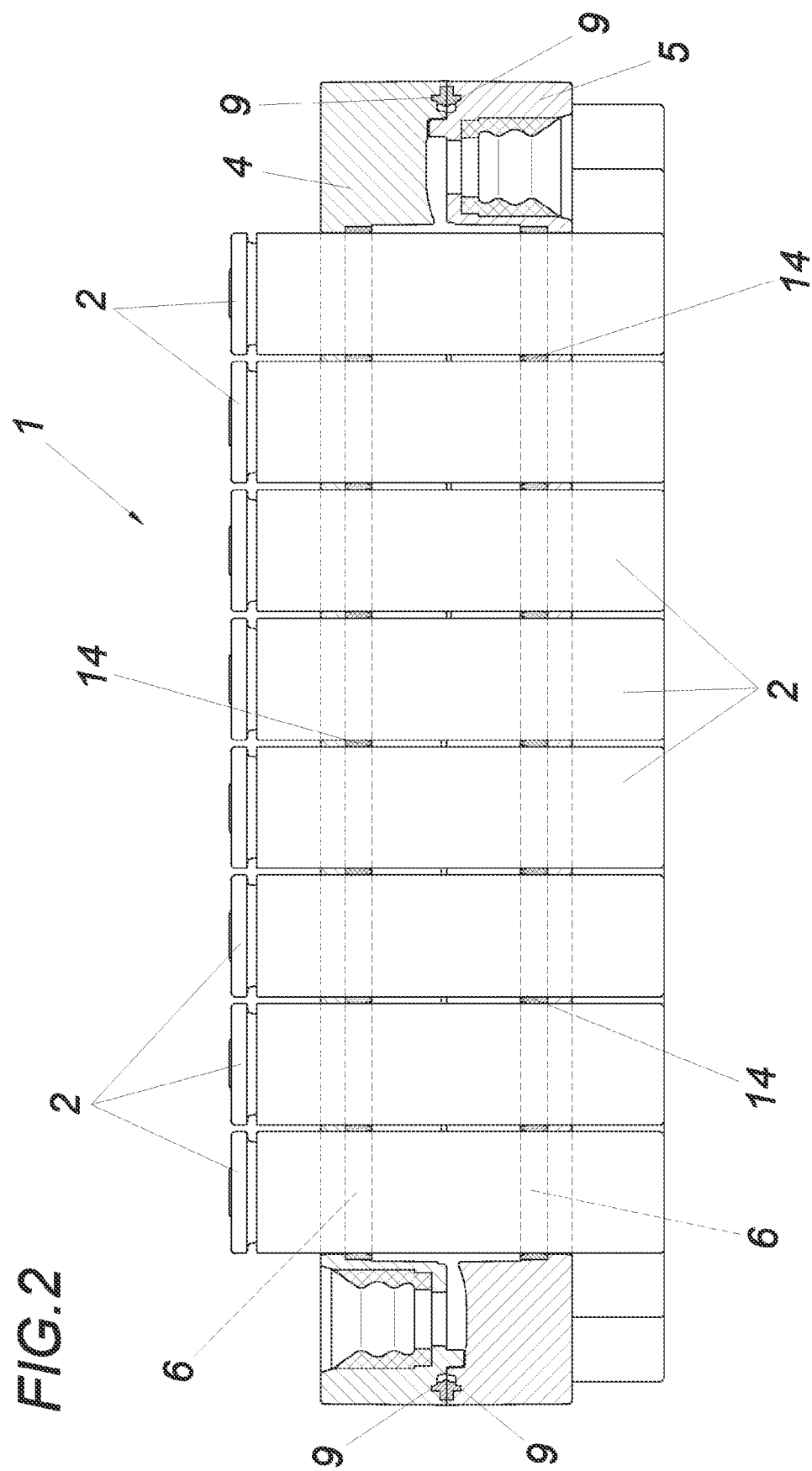
Figure 5:
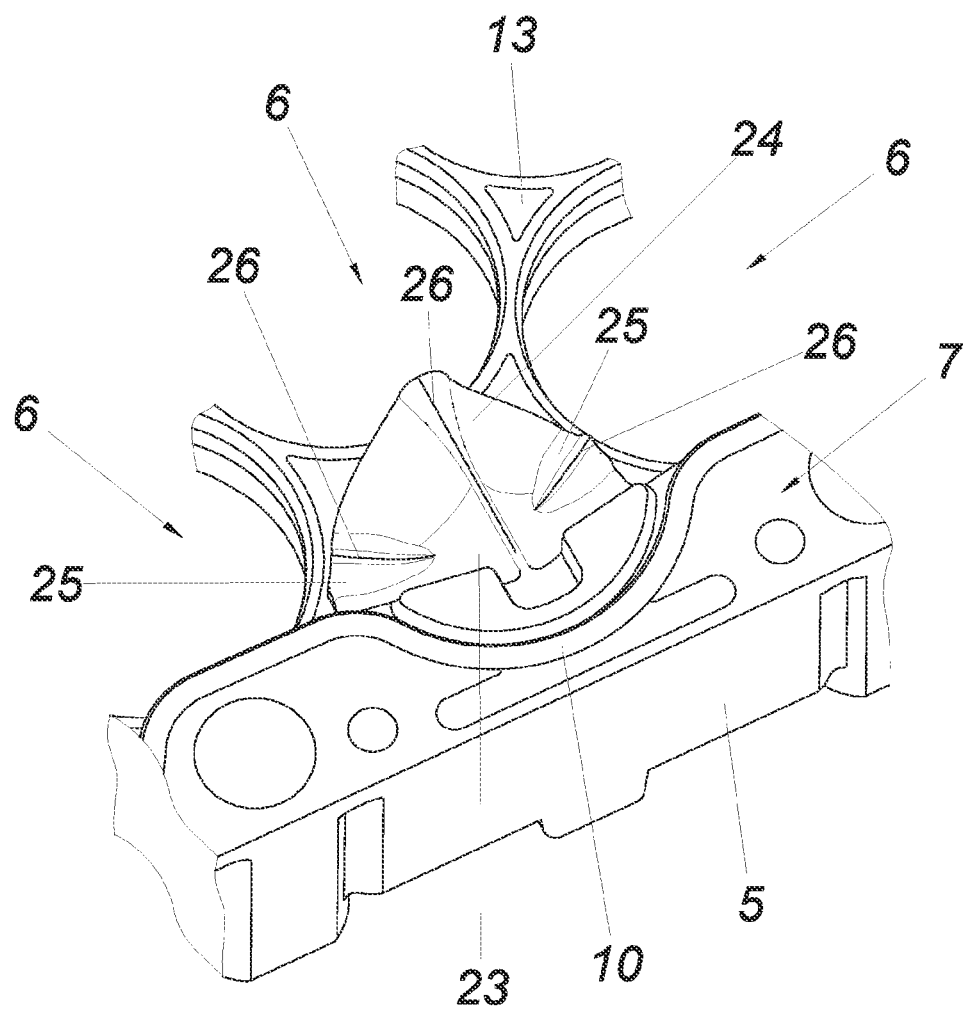

FIG. 1 is a schematic representation of a temperature control device according to the invention, FIG. 2 a schematic side view of an assembled module on a larger scale, FIG. 3 an enlarged detail view of FIG. 1 with non-joined sealing elements, FIG. 4 another enlarged detail view of FIG. 1 with joined sealing elements and FIG. 5 an enlarged detail view of a flow divider shown in FIG. 1.

WAYS TO EXECUTE THE INVENTION

A temperature control device in accordance with the invention for individual battery cells 2 assembled to form a module 1 comprises a base body 3 with two opposing sealing elements 4,5. For circumferential enclosure of the battery cells 2, the sealing elements 4,5 have passage openings 6 which are arranged in pairs with respect to one joining axis each. The base body 3 forms a flow channel extending transversely to the joining axes for a temperature control fluid to control the temperature of the battery cells 2. The sealing elements 4,5 are designed as two, for example injection-molded, identical parts. When they are joined together, they are aligned point-symmetrically to each other and connected to each other via a circumferential bearing surface 7, thus forming the basic body 3.

On the inside of the base body, a receiving groove 9 with a seal compensation region 8 is connected to the bearing surface 7. A circumferential edge seal 10 is inserted into the respective groove 9 of the sealing elements 4.5. Particularly favorable production conditions and a good seal between the edge seal 10 and the receiving groove 9 are achieved when the edge seal 10 is connected to the receiving groove 9 in the multi-component injection molding process, where the edge seal 10 is a soft component, e.g. in the form of a thermoplastic elastomer, and the receiving groove 9 is a hard component, e.g. in the form of polyoxymethylene.

In addition, the sealing elements 4,5 each have 6 supporting pins 11 projecting on the inside of the base body between three adjacent passage openings 6 and extending in the direction of the joining axes, which supporting pins 11 form a supporting body 13 in the transition area 12 to the passage openings 6 for the passage seals 14 extending in the circumferential direction of the passage openings 6. In the assembled state, the supporting pins 11 rest on each other with their respective contact surfaces 15. The supporting bodies 13 can also be provided in the transition areas 16 without supporting pins. As can be seen in FIG. 1, the support pins 11 can be reinforced by three webs 17 each extending to the transition area 12 for better pressure distribution. Analogous to the edge seal 10 and the receiving groove 9, the passage seals 14 can also be connected to the supporting bodies 13 in the multi-component injection molding process.

FIG. 2 shows an assembled module 1 with battery cells 2 inserted through the passage opening 6 and enclosed on the circumference by the passage seals 14.

As can be seen in FIGS. 3 and 4, the receiving groove 9 has a protruding positioning step 19 for an edge seal 10 compared to the groove base 18. When the two sealing elements 4,5 are joined together, some of the edge seals 10 that come into contact with each other and are elastically deformed due to the required surface pressure may move into the seal compensation region 8 as shown in FIG. 4. In addition, the edge seal 10 can have a sealing bead 21 that slopes down under the supporting surface 7 and underneath it, thus forming a second sealing compensation region 22 on the outside of the base body, which is connected to the receiving groove 9.

FIG. 5 shows a detailed view of a flow divider 23 in a sealing element 4 as shown in FIG. 1. The flow divider 23 comprises a main guide ridge 24 and secondary guide ridges 25. Both the main guide ridge 24 and the secondary guide ridges 25 each have a crest 26 that widens towards the adjacent passage openings 6. FIG. 1 also shows that the cross section of the main guide ridge 24 and the secondary guide ridge 25 increases towards the adjacent passage openings 6. In addition, the sealing elements 4,5 each have a temperature control fluid connection 27, so that in the assembled state one temperature control fluid connection 27 of one sealing element 4 is opposite the flow divider 23 of the respective other sealing element 5.

The temperature control fluid connections 27 can form female sleeves 28, so that two successive base bodies can be flow-connected to each other via a male connector inserted into the two sleeves 28, due to the fact that the sealing elements 4,5 have the same parts.

The invention claimed is:

1. A temperature control device for individual battery cells assembled to form a module, said temperature control device comprising:
   a base body circumferentially enclosing the battery cells, wherein said base body comprises two opposing sealing elements having passage openings located opposite one another in pairs with a respective joining axis; and
   wherein said base body defines a flow channel extending transversely to the joining axes for a temperature control fluid;
   wherein the sealing elements are two molded parts that are identical to one another and that are aligned point-symmetrically with respect to one another and connected to one another; and
   wherein said which sealing elements each has a respective bearing surface, and said bearing surfaces engage each other so as to form the base body; and
   wherein a receiving groove having a seal compensation region adjoins the bearing surface inside of the base body.

2. A temperature control device according to claim 1, wherein in the receiving groove a positioning step engages an edge seal, wherein said positioning step protrudes relative to a base of the receiving groove, and a groove region remaining free above the positioning step forms the seal compensation region.

3. A temperature control device according to claim 1, wherein an edge seal has a sealing bead that slopes down towards and underneath the bearing surface.

4. A temperature control device according to claim 1, wherein the sealing elements each have supporting pins projecting on an inside of the base body between three of the passage openings that are adjacent each other, and extending in a direction of the joining axes, said supporting pins forming a supporting body in a transition region to the passage openings for passage seals extending circumferentially of the passage openings.

5. A temperature control device according to claim 1, wherein an edge seal is connected to the receiving groove in a multi-component injection molding process.

6. A temperature control device according to claim 4, wherein the passage seals are connected to the supporting bodies using a multi-component injection molding process.

7. A temperature control device according to claim 1, wherein the sealing elements each have a temperature control fluid connection and a flow divider, wherein the flow divider of one of the sealing elements is opposite the temperature control fluid connection of the respective other sealing element, which is aligned point-symmetrically therewith.

8. A temperature control device according to claim 7, wherein the flow divider has a main guide ridge extending substantially radially to a first passage opening adjacent to the flow divider.

9. A temperature control device according to claim 8, wherein the flow divider comprises two secondary guide ridges extending symmetrically to the main guide ridge and each of said secondary guide ridges extending substantially radially to a respective passage opening adjoining the first passage opening.

10. A temperature control device according to claim 2, wherein the edge seal has a sealing bead that slopes down towards and underneath the bearing surface.

11. A temperature control device according to claim 2, wherein the sealing elements each have supporting pins projecting on an inside of the base body between three of the passage openings that are adjacent each other, and extending in a direction of the joining axes, said supporting pins forming a supporting body in a transition region to the passage openings for passage seals extending circumferentially of the passage openings.

12. A temperature control device according to claim 2, wherein the edge seal is connected to the receiving groove in a multi-component injection molding process.

13. A temperature control device according to claim 10, wherein the edge seal is connected to the receiving groove in a multi-component injection molding process.

14. A temperature control device according to claim 4, wherein the sealing elements each have a temperature control fluid connection and a flow divider, wherein the flow divider of one of the sealing elements is opposite the temperature control fluid connection of the other sealing element, which is aligned point-symmetrically therewith.

15. A temperature control device according to claim 14, wherein the flow divider has a main guide ridge extending substantially radially to a first passage opening adjacent to the flow divider.

16. A temperature control device according to claim 15, wherein the flow divider comprises two secondary guide ridges extending symmetrically to the main guide ridge, and each of said secondary guide ridges extending substantially radially to a respective passage opening adjoining the first passage opening.

* * * * *